United States Patent
Stevick et al.

(10) Patent No.: US 10,870,904 B2
(45) Date of Patent: Dec. 22, 2020

(54) BULK METALLIC GLASS INTERFERENCE LAYERS

(71) Applicant: Crucible Intellectual Property, LLC, Rancho Santa Margarita, CA (US)

(72) Inventors: Joseph W. Stevick, Lake Forest, CA (US); Adrian Lopez, Lake Forest, CA (US)

(73) Assignee: Crucible Intellectual Property, LLC, Rancho Santa Margarita, CA (US)

( * ) Notice: Subject to any disclaimer, the term of this patent is extended or adjusted under 35 U.S.C. 154(b) by 268 days.

(21) Appl. No.: 15/648,249

(22) Filed: Jul. 12, 2017

(65) Prior Publication Data

US 2018/0016661 A1    Jan. 18, 2018

Related U.S. Application Data

(60) Provisional application No. 62/362,415, filed on Jul. 14, 2016.

(51) Int. Cl.
| | |
|---|---|
| *B32B 15/04* | (2006.01) |
| *C22C 1/00* | (2006.01) |
| *C22C 45/10* | (2006.01) |
| *C22C 45/00* | (2006.01) |
| *C22C 45/08* | (2006.01) |
| *B32B 3/30* | (2006.01) |
| *C25D 11/02* | (2006.01) |
| *C25D 11/26* | (2006.01) |
| *C22C 16/00* | (2006.01) |
| *C23C 18/18* | (2006.01) |

(52) U.S. Cl.
CPC ............ *C22C 1/002* (2013.01); *B32B 3/30* (2013.01); *B32B 15/043* (2013.01); *C22C 45/001* (2013.01); *C22C 45/08* (2013.01); *C22C 45/10* (2013.01); *C25D 11/022* (2013.01); *C25D 11/26* (2013.01); *C22C 16/00* (2013.01); *C23C 18/1806* (2013.01)

(58) Field of Classification Search
None
See application file for complete search history.

(56) References Cited

U.S. PATENT DOCUMENTS

| | | | |
|---|---|---|---|
| 4,696,731 A * | 9/1987 | Tenhover | C25B 11/0478 |
| | | | 204/192.15 |
| 2003/0045078 A1 * | 3/2003 | Ahn | H01L 21/28194 |
| | | | 438/585 |
| 2005/0087406 A1 * | 4/2005 | Meckel | F16D 65/12 |
| | | | 188/71.1 |

(Continued)

FOREIGN PATENT DOCUMENTS

CN        104745974 A  *  7/2015

OTHER PUBLICATIONS

English Translation of CN 104745974 (published Jul. 2015) from Espacenet.*

*Primary Examiner* — George Wyszomierski
(74) *Attorney, Agent, or Firm* — Brownstein Hyatt Farber Schreck, LLP

(57) ABSTRACT

BMG parts having an uniform and consistently thick metal oxide layer. The metal oxide layer, also known as an interference layer, exhibits a consistent color and durability over the entire surface of the part. Methods and devices involved in forming the BMG parts with uniformly thick interference layers are also provided.

20 Claims, 11 Drawing Sheets

(56) References Cited

U.S. PATENT DOCUMENTS

2008/0034796 A1\* 2/2008 Muramatsu ............ B21D 37/01
  65/60.1
2013/0075262 A1\* 3/2013 Teng ...................... C25D 11/26
  205/50
2013/0083500 A1\* 4/2013 Prest ...................... B41M 5/262
  361/757
2017/0087691 A1\* 3/2017 Yokoyama ................ B24C 1/06

\* cited by examiner

BULK METALLIC GLASS INTERFERENCE LAYERS

CROSS-REFERENCE TO RELATED APPLICATION

This application claims the benefit under 35 U.S.C. § 119(e) to U.S. Provisional Patent Application No. 62/362,415, filed Jul. 14, 2016, and entitled "Bulk Metallic Glass Interference Layers," the contents of which are incorporated by reference as if fully disclosed herein.

FIELD

The disclosure relates generally to bulk metallic glass articles having a surface layer of uniformly thick and composed metal oxide, and to methods of fabricating the same. In particular, the disclosure provides bulk metallic glass articles having an uniformly thick and composed zirconium oxide containing layer, as well as to the methods for producing the same.

BACKGROUND

Oxidation on metal surfaces is a well know process resulting in the formation of metal oxide and metal oxide containing layers. Metal oxides on a surface can be detrimental, as is the case of iron oxide (rust), or protective, as is the case of aluminum oxide (protects the metal surface from corrosion/rust). Metal oxides on or within a part can also be decorative or used for aesthetic purposes, as metal oxides can have a wide spectrum of hues ranging from black to brown, green, blue, yellow and/or red, for example.

Oxidation, as would be expected, also affects surfaces of articles formed of bulk metallic glasses, as these alloys contain various combinations of metallic elements. In addition, manufacture of bulk metallic glass containing articles requires a high input of heat to bring the alloys to at least their glass transition temperature, where the heat also facilitates oxide formation. As such, oxidation is a particularly relevant issue for articles formed of bulk metallic glass.

In this light, it is known that transition metals (a significant constituent in bulk metallic glass) are highly reactive to oxygen, particularly at temperatures above 300° C. In most bulk metallic glass alloys, the application of heat and air to the surface of the article causes the formation of thin oxide layers out of the transition metal constituents. This is particularly true where the bulk metallic part includes zirconium, a transition metal that readily forms stable oxides at elevated temperatures. Depending on the constituents of the air, the constituents of the alloy, the formation and quenching temperatures for the part being formed, and the time required during formation of the part, an oxide layer as thick as, for example, 3 μm or as thin as 5 nm may be formed.

Various metal oxides, as noted above, tend to form protective layers from corrosion. In bulk metallic glass, the protective layers can be formed from zirconium oxide, titanium oxide, and palladium oxide, for example. Each oxide layer is stable and prevents other elements in the bulk metallic glass, or associated metals, from forming corrosive oxides, like iron oxide, or has its own associated color, like brown or blue. However, formation of metal oxides in the context of bulk metallic glass can be extremely inconsistent, even in the context of the surface of the same part, as metal oxide formation is sensitive to small changes in temperature and air constituents.

Anodizing or anodization (the same process which can also referred to as oxidation) is a process used to increase the thickness of an oxide layer on the surface of a metal. This process recognizes the benefit of artificially increasing the thickness of a protective or decorative oxide layer on a metal surface, as compared to allowing detrimental oxidation processes, like corrosion, affect the same metal surface.

Minor inconsistencies in metal oxide formation, however, may have a significant impact on the level of protection afforded by the protective oxide layer to the article, and further, on the consistency of the article's color. Add to this, the use of anodization technology to facilitate protective oxide layer formation on bulk metallic glass, and the layer composition and thickness within any one part, or between any two parts, could have significant impact on the durability of the surface, and the decorative look of the surface.

SUMMARY

Embodiments herein include, bulk metallic glass (BMG) parts with a protective metal oxide layer (referred to herein as an interference layer) which exhibits a consistent and uniform thickness and color across the entirety of the part's surface, and to the methods and devices for preparing these same parts.

Embodiments herein also include, high volume production methods for preparing BMG parts, where each part within a batch of parts has substantially the same interference layer thickness, with the same consistent and uniform surface color.

Finally, embodiments herein include positioning multiple and different protective oxide layers on different predetermined regions of the same BMG part to exhibit two or more different colors on the BMG part, and to the methods and devices for preparing the same.

Production of interference layer containing BMG parts, in accordance with the present disclosure, include using methods, materials and modifications for anodizing the part under highly controlled conditions. In one aspect, the surface of the BMG part is modified, prior to anodization, to allow for enhanced uniform heating along the entire surface of the BMG part. In another aspect, the BMG part is heated in a loose fitting mold constructed from a high thermal conductivity and heat capacity material. In both aspects of the disclosure, the BMG part surface is heated to ensure uniform surface heating, and therefore part heating, and thereby allow for the anodization of uniformly thick interference layers.

In one embodiment, the surface of the BMG part is prepared to exhibit uniform roughness, i.e., to exhibit uniformly distributed peaks and valleys across the surface of the part. Roughness of the part may be accomplished by media blasting, tumbling, etching, or other like means. A BMG part with an appropriately roughened surface is more efficient at energy absorption during anodization, than an identical BMG part with a smooth surface. As such, a roughened surface part will be anodized under highly controlled conditions, allowing for formation of a consistent and uniformly thick and composed interference layer.

In another embodiment, the BMG part is heated in a loose fitting mold to obtain uniform anodization of the part's surface. The mold itself can have a smooth inner surface, or a roughened inner surface, for a more consistent contact with the BMG part during heating. As above, uniform heating of the BMG part during anodization allows for highly controlled interference layer formation in both thickness and composition.

Other features and advantages of the present disclosure will be apparent from the accompanying drawings and from the detailed description that follows below.

BRIEF DESCRIPTION OF THE DRAWINGS

The disclosure will be readily understood by the following detailed description in conjunction with the accompanying drawings, wherein like reference numerals designate like structural elements, and in which:

FIG. 2A shows a consistent thickness interference layer that shows destructive interference over the entire surface of the frame; FIG. 2B shows a consistent thickness interference layer that shows constructive interference over the entire surface of the frame; and FIG. 2C shows an inconsistently thick interference layer over the surface of the BMG frame. The interference shown is for a specific set of wavelengths which correspond to colors in the visible spectrum. For example, an oxide layer of a first thickness and index of refraction, can appear to be green because other visible electromagnetic wavelengths are canceled out (destructively interfering), while the green wavelengths are constructively interfering. Likewise, an oxide layer of a second thickness and index of refraction can appear to be red because the constructive and destructive wavelengths are now in different parts of the visible spectrum.

FIG. 7A shows the mold before receiving the BMG part, and FIG. 7B shows the mold after receiving the BMG part.

DETAILED DESCRIPTION

Figure 1:
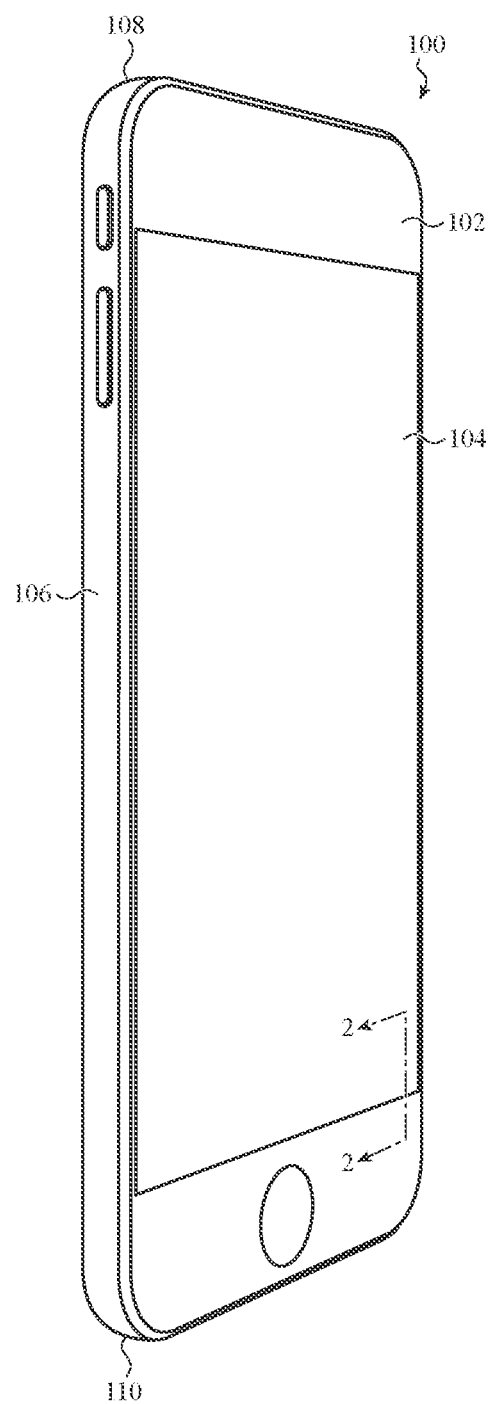
FIG. 1 is a diagrammatic representation of a handheld electronic device showing a BMG composed frame capturing a cover glass.

All publications, patents and patent applications cited in this document are hereby incorporated by reference in their entirety.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to the highly controlled growth and stabilization of interference layers of metal oxides on the surfaces of BMG containing parts. Embodiments herein allow for the preparation of BMG parts that exhibit consistent and uniformly thick interference layers, and therefore exhibit consistent and uniform surface colors. Consistent and uniformly thick interference layers, in accordance with the present disclosure, can be developed on BMG parts, where the BMG is based on or includes a minimal amount of one or more of any metal that forms an oxide below the crystallization temperature of the BMG. Illustrative metals that fit this description include: zirconium, titanium, palladium, tin, copper, aluminum, beryllium, magnesium, hafnium and nickel.

As described herein, BMG refers to any of the metallic alloys that exhibit a substantially amorphous atomic structure (non-crystalline) and exhibit the following characteristics: 1) the alloy systems generally include at least three components; 2) the alloys are produced at cooling rates of $10^3$ K/s or less; 3) the alloys have large critical casting thickness limits (the largest diameter cross-section achievable for a particular BMG alloy based on its "critical cooling rate" which is the quench rate necessary to form the BMG. If the alloys is quenched less quickly than its critical cooling rate the alloy no longer retains its liquid-like amorphous structure as a solid), typically at least 1 mm, and more typically at least 2 mm in thickness; and 4) the alloys have a large supercooled liquid region, i.e., at least a few tens of degrees (supercooled region, as referred to herein, is the difference between the alloy's glass transition temperature ($T_g$) and alloy's crystallization temperature ($T_x$)).

A BMG typically contains atoms of different sizes, leading to low free volume and high viscosity in a molten state. High viscosity prevents the atoms from moving enough to form an ordered lattice. In order to achieve formation of an amorphous structure, even during slower cooling, the BMG alloy is typically made of three of more components, leading to complex crystal units with higher potential energy and a lower probability of formation. Formation of amorphous alloys depends on several factors including: the identity and number of components in the alloy, the atomic radius of the components, and the negative heat of mixing the combination of components.

With regard to amorphicity, BMG articles are typically substantially amorphous in nature. The degree of amorphicity can be measured as the fraction of crystals present in the BMG. A substantially amorphous BMG refers to a BMG article where at least about 90% of the BMG is amorphous, and more typically at least about 95% amorphous, and often at least 99% amorphous. In some embodiments, the BMG article is at least 99.5% amorphous, and in other embodiments the BMG article is about 99.6%, 99.7%, 99.8%, 99.9% and 100% amorphous.

BMG alloys of embodiments herein may have the formula $(Zr,Ti)_a(Ni,Cu,Fe)_b(Be,Al,Si,B)_c$, wherein "a", "b", and "c" each represent a weight or atomic percentage. In one embodiment, "a" is in the range of from 30 to 75%, "b" is in the range of from 5 to 60%, and "c" is in the range of from 0 to 50%.

Alternatively, a BMG alloy can have the formula $(Zr,Ti)_a(Ni,Cu)_b(Be)_c$, where "a", "b", and "c" each represents a weight or atomic percentage. In one embodiment, "a"

is in the range of from about 40 to 75%, "b" is in the range of from about 5 to 50%, and "c" is in the range of from about 5 to 50%.

In another embodiment, the BMG alloy can also have the formula $(Zr,Ti)_a(Ni,Cu)_b(Be)_c$, where "a", "b", and "c" each represent a weight or atomic percentage. Here, "a" can be in the range of from 45 to 65%, "b" in the range of from 7.5 to 35%, and "c" in the range of from 10 to 37.5%.

In still another embodiment, the BMG alloy can have the formula $(Zr)_a(Nb,Ti)_b(Ni,Cu)_c(Al)_d$, where "a", "b", "c", and "d" each represents a weight or atomic percentage. Here, "a" is in the range of from 45 to 65%, "b" is in the range of from 0 to 10%, "c" is in the range of from 20 to 40%, and "d" is in the range of from 7.5 to 15%. One illustrative embodiment is a Zr—Ti—Ni—Cu—Be based alloy under the tradename Viteloy™.

Other embodiments include BMG alloys that have both ferrous and zirconium materials, like $Fe_{72}Al_7Zr_{10}Mo_5W_2B_{15}$.

Each of the above described BMG alloys may also include further elements, such as additional transitional metal elements. In some aspects, the additional transitional metal element is added to tint the part to a particular color, as that element's oxide, in accordance with the embodiments herein. For example, the BMG alloys may also include: titanium, chromium, tungsten, manganese, palladium, and the like. These elements may be added to the BMG, totaling up to 10 wt %, 5 wt %, 2 wt %, 1 wt % and 0.5 wt % of the total alloy's weight.

Note that amorphous alloys may also include a small amount of impurities. In some instances, the impurities are added to modify the properties of the alloy. In other instances, the impurities are present as inevitable and incidental, such as those obtained as a byproduct of processing and/or manufacturing. Impurities can be less than or equal to 10 wt %, 5 wt %, 2 wt %, 1 wt %, 0.5 wt % and 0.1 wt %. As discussed below, one of the unexpected benefits of the embodiments described herein is that impurity-oxide formation during BMG article formation can be standardized by controlling the exact heating and cooling parameters of the BMG articles.

As described herein, BMG parts are still considered BMG in nature even if they include some amount of crystallinity.

Interference Layers

Embodiments herein are directed at anodizing a surface oxide of uniform thickness and appearance on a molded BMG part, and more typically on a molded zirconium-, titanium-, or palladium-based BMG part. For purposes of this disclosure, the uniform oxide layer is termed an interference layer. Aspects of the present disclosure also include methods for achieving the same.

For purposes herein, uniform appearance or coloring of a molded part refers to a part having an interference layer where the thickness of the layer over the surface of the part is consistent, and varies by less than 20%, more typically less than 15%, and can vary less than 10%, 9%, 8%, 7%, 6%, 5%, 4%, 3%, 2%, 1%, 0.5%, 0.1% and 0%.

As discussed in more detail below, a BMG part in accordance with this disclosure, has a particular color based, in part, on the composition and thickness of the part's interference layer. A uniformly composed and thick interference layer will exhibit a uniform coloring. Obtaining a uniformly composed and thick interference layer on a BMG part has proven problematic. This is particularly true since BMG parts typically require anodization to artificially increase the interference layer thickness for enhancing the layer's protective function and the layer's durability.

Uniformity of a part's interference layer is dependent on the entire surface of the part being brought to a target anodization temperature, in a time sufficient to provide the same oxide layer formation conditions for the entire part's surface, even in areas where the part is thicker and the heat is drawn from the surface quicker due to the thermal conductivity of the BMG metal. This typically requires that the part's surface be heated to the exact same temperature over the exact same amount of time.

It is also described herein that anodization parameters require that crystal formation in the BMG part should be minimized. For example, slowly heating a BMG part of varying dimensions to a target anodization temperature can result in crystallization of portions of the part through slow crystallization kinetics (diffusion of atoms and formation of energetically favorable crystalline phases at temperatures below the crystallization temperature Tx), thereby negating the value of the uniformly thickened oxide layer, i.e., the part may have a consistent surface color, but the color is of limited value due to an increase in the part's crystallinity. In embodiments herein, uniformity of a BMG part's interference layer thickness and composition is accomplished while minimizing and/or eliminating further BMG crystal formation. This is an unexpected and surprising utility of the present disclosure.

As discussed in more detail below, in one embodiment, the surface of the BMG part is modified such that the surface exhibits uniformly distributed peaks and valleys which allow for faster more efficient energy absorption during anodization.

Also discussed in more detail below, in one embodiment, the surface of the BMG part is heat anodized by direct physical contact in a BMG Heat Anodization Mold (BHAM). Embodiments of each aspect are described in more detail below.

FIGS. 1-10

Embodiments herein are described in greater detail with reference to FIGS. 1-10.

With reference to FIG. 1, a portable electronic device 100 is described in accordance with an embodiment disclosed herein. A portable electronic device may include a frame 102 that surrounds a cover glass 104. The frame has a side 106, top 108 and bottom 110 as shown (back cover not shown). The frame 102 may be made wholly of, or partially of, a BMG. The cover glass 104 can be a glass article as is known in the art. In accordance with embodiments herein, the portable electronic device 100 has a consistent color based on the uniform thickness of the metal oxide or interference layer anodized onto the frame 102. In one embodiment, the portable electronic device in FIG. 1 has a frame composed of a BMG that includes some amount of zirconium, titanium, palladium, tin, copper, aluminum, beryllium, magnesium, and/or nickel. In other embodiments the frame is composed of a BMG having at least 15% to 70%, more typically 30 to 70% and most typically 30 to 50%, by weight percent, zirconium, titanium, palladium or mixtures thereof. Uniform color of the entire frame is a significant benefit for portable electronic devices, and the ability to automate manufacturing and obtain consistent color between each frame of portable electronic devises is also of significance. It is noted that a uniformly thick interference layer also serves to consistently protect the frame from other more harmful oxide formation, such as corrosion, and thereby make the durability of each frame predictable.

FIG. 2 is a cross-sectional view along line 2-2 in FIG. 1. FIG. 2 shows that the thickness of an interference layer on a frame, like shown in FIG. 1, has a significant effect on the frame's surface color or chromatic look.

Figure 2A:
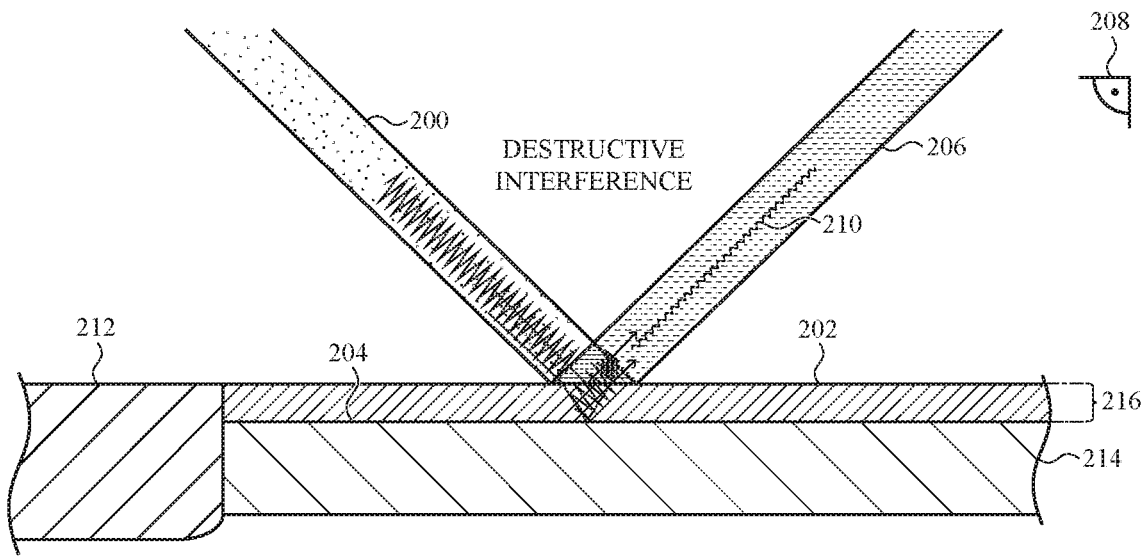
FIGS. 2A, 2B and 2C are schematic views along line 2-2 of FIG. 1 illustrating various interference layer thicknesses on the BMG frame.

For example, in FIG. 2A, light waves 200 are reflected by an interference layers outer boundary 202, or transmitted/reflected at the surface of the frame 204, allowing the two reflected waves to form a single new wave 206 visualized by the viewer 208. In FIG. 2A, the reflected wave 206 has undergone destructive interference (attenuated) due to the thickness and composition of the interference layer 216, yielding a wave with very little amplitude (minimal brightness) and potentially a changed wavelength (color) 210. A glass article 212 is shown abutting the frame 214.

Figure 2B:
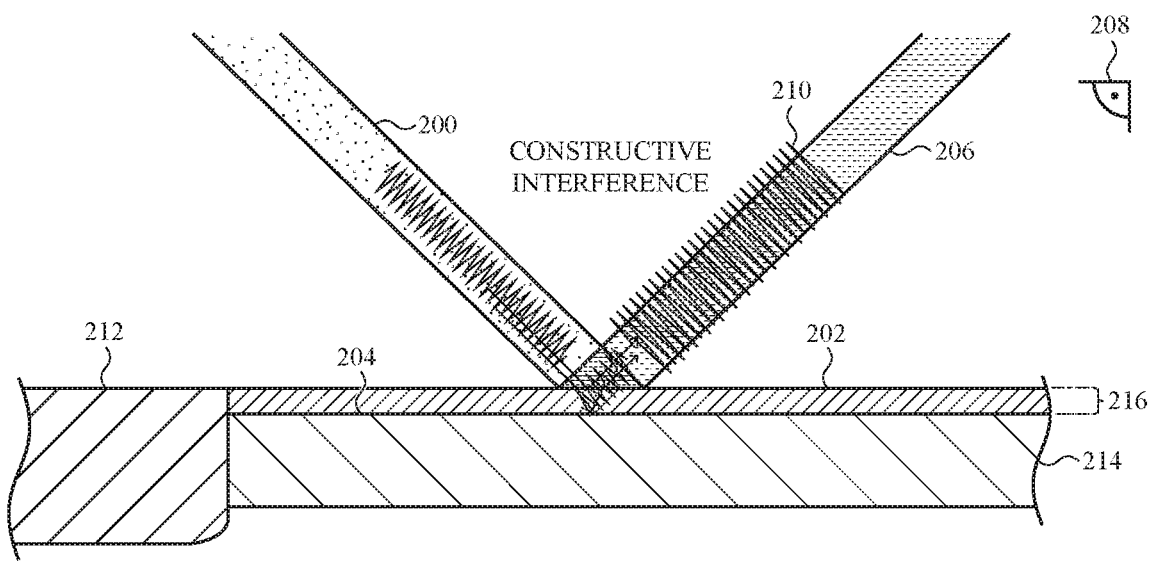
Figure 2C:
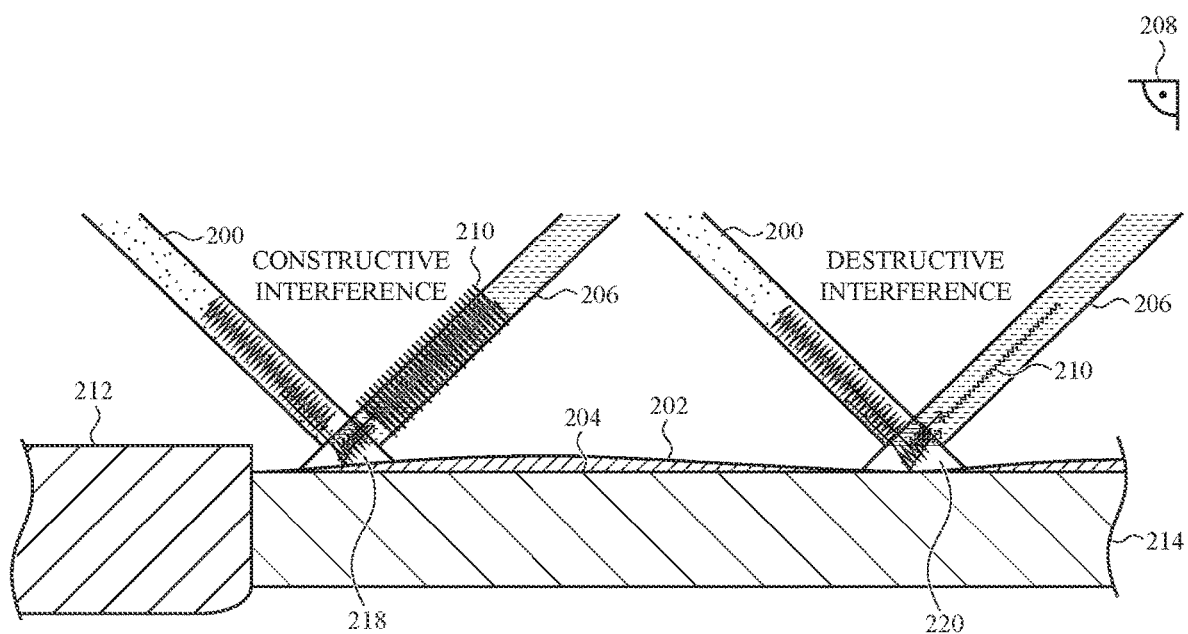

In FIG. 2B, a small variation in the interference layer thickness 216 can have a significant impact on the single resultant wave 210, for example, the resultant wave can have undergone constructive interference, for example. As such, small changes in interference layer thickness can have a significant impact on the resultant light's wavelength and therefore color. The chromatic look of the frame 214 shown in FIG. 2A and frame shown in FIG. 2B, would be different, all based on the thickness of the interference layer, even where the material composition of the layers in FIG. 2A and FIG. 2B are identical. As shown in FIG. 2C, a BMG part having inconsistent oxide layer thicknesses over its surface results in a frame 214 where reflected light waves exhibit differing frequency, amplitudes and wavelengths. In this case, the frame would have differing chromatic hues associated with the different oxide layer thicknesses (see, for example, 218 and 220) and index of refraction. Inconsistent part color, and oxide layer protection, has a detrimental effect on the part's usefulness and value.

Surface Preparation

Embodiments herein include BMG parts having an uniformly roughened surface that provides for uniform heating of the surface, particularly during anodization. Uniformly rough BMG surface preparation requires the creation of uniformly distributed peaks and valleys across the surface of the target part. In typical embodiments the uniformly distributed peaks (and valleys) are sufficiently spaced to allow for the part to be brought up to a target anodization temperature within a target amount of time.

Figure 3A:
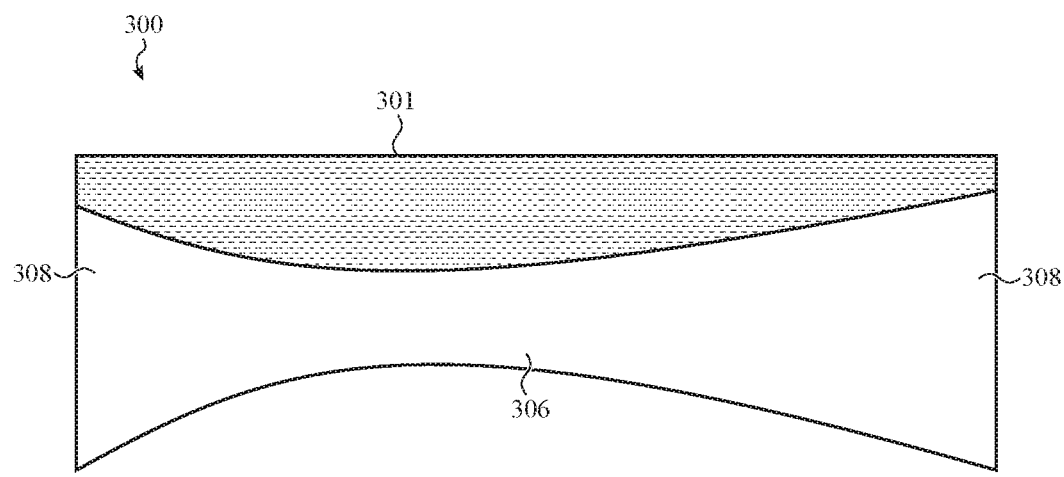
FIGS. 3A and 3B show a schematic cross section of heat flow in both a smooth surface BMG part (FIG. 3A) and a roughened surface BMG part (FIG. 3B).
Figure 3B:
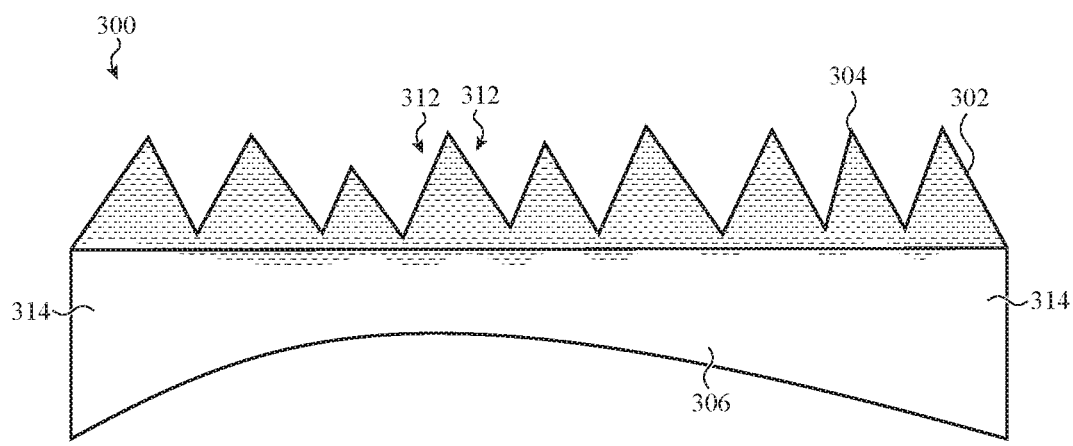

In more detail, FIG. 3A shows an as-molded heat flow diagram of a BMG part 300 having a relatively smooth surface 301, while FIG. 3B shows a corresponding heat flow diagram of the same BMG part 300 having a modified surface 302 in accordance with embodiments of the disclosure.

The peaks 304 in FIG. 3B can be more uniformly brought up to the anodization temperature because they are able to absorb the energy from the anodization source faster than the energy can be absorbed into the bulk of the part 306, as shown in FIG. 3A.

In contrast, by slowly heating a BMG part for a long period of time, the entire surface of the part can be uniformly heated, but only after the entire part has equilibrated thermally, which allows time for inconsistent oxide layer formation. As shown in FIG. 3A, where a part has a smooth surface, the interference layer is thinnest where the part is thickest 308 as the part draws more heat away from the surface, than can be absorbed by the surface from the air. Conversely, the interference layer is thickest where the part is thinnest 306 as the part draws more heat into the surface. Parts of varying dimensions, having smooth surfaces, would exhibit an interference layer with inconsistent thickness and coloring (see also FIG. 2C).

FIG. 3B shows that the peaks 304 readily heat to a uniform temperature due to the peaks and valleys higher surface area to volume ratio. The roughened surface can absorb the heat 312 faster than the part can draw the heat away 314 and 306, thickest and thinnest, respectively. The uniform heating allows for the anodization to provide a uniformly thick interference layer, and thereby coloring.

As shown in FIG. 3B, increasing the uniformity of the interference layer can be accomplished by means of appropriately preparing the surface of the BMG part. Surface preparation or "roughening" can be accomplished by media blasting, tumbling, etching, or other like roughening methods.

Surface prepared BMG parts, in accordance with embodiments herein, generally exhibit uniformly distributed peaks and valleys across the surface of the part. The roughening process is performed prior to anodization, and allows the heat to more rapidly flow into the higher surface area, lower volume, 'skin' of the part. The roughened surface also provides a slight texture to the part, useful in the aesthetic appearance of the part.

As an added and unique benefit, the surface preparation embodiments herein are performed under conditions that limit crystal formation in BMG parts (as compared to smooth parts). First and foremost, anodization temperatures for the surface roughened BMG parts are chosen to be below the part's crystallization temperature (Tx), and yet sufficient to allow for oxide formation with various elements of the BMG. If the anodization temperature is above the part's Tx, regardless of the surface roughness, the BMG will crystalize very rapidly, making the part unstable, i.e., part would have a high percent of non-amorphous or crystalline content.

Figure 4:
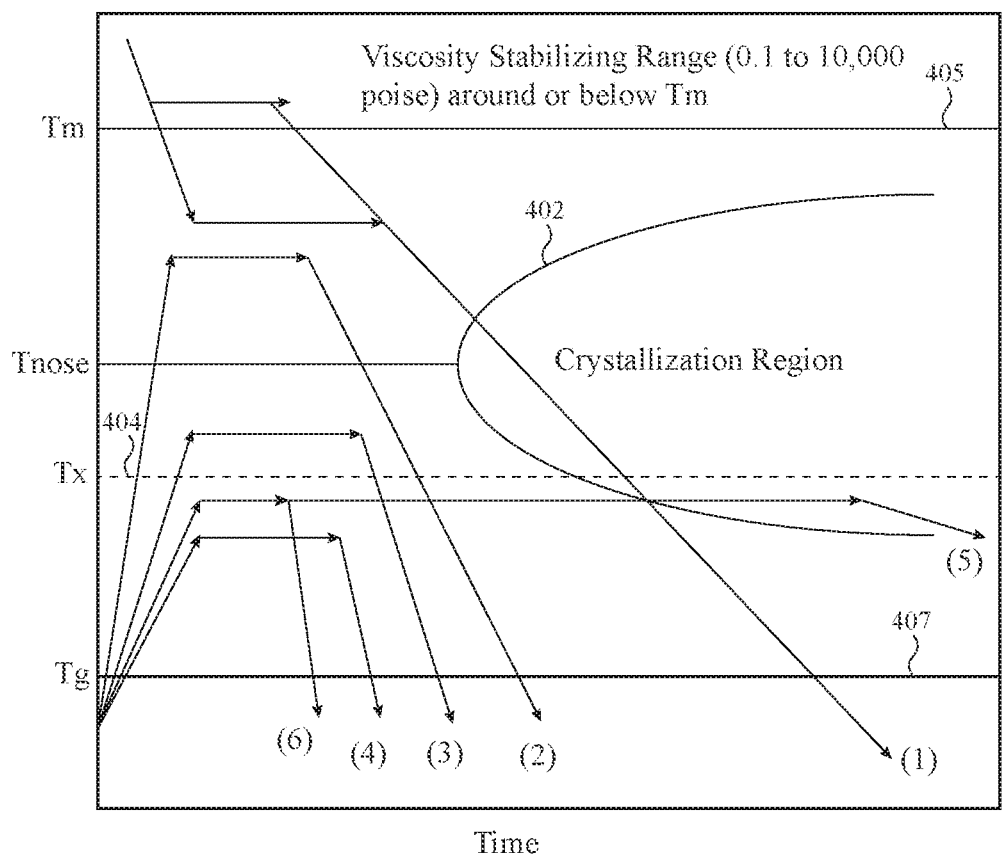
FIG. 4 shows an illustrative Tx as a function of time and temperature plot with a typical crystallization region, in accordance with embodiments herein.

However, non-uniform and prolonged heating and cooling of a BMG part, particularly a non-uniformly dimensioned, BMG part, can result in crystallization, even where the heating is below the BMG's Tx. As shown in FIG. 4, a Time-temperature-transformation cooling curve is shown for BMG alloys. BMG does not experience a liquid/solid crystallization transformation, as would a conventional metal. Instead, the highly fluid, non-crystalline form of the metal, at high temperatures (near the Tm), becomes more viscous as the temperature is reduced, eventually taking on the outward physical properties of a convention solid.

In FIG. 4, the nose-shaped curve 402 shown in the phase diagram describes the phase transition from amorphous to crystalline as a function of temperature and time. Thus, regardless of the thermal history trajectory (see trajectories 1-6) that is taken while heating or cooling a metal alloy, when one hits the curve, the transformation from amorphous to crystalline phase begins (1 and 5). In FIG. 4, Tx is shown as a dashed line 404, as Tx can vary from close to Tm 405 to close to Tg 407. Tx is the temperature above which the amorphous BMG rapidly crystallizes regardless of time (see trajectory 3, which would result in a fully crystalline product). Thermal trajectory number 5 in which the BMG remains below Tx, but stays at an elevated temperature long enough to pass through into the crystallization nose is the situation often required when the part's surface is smooth (see FIG. 3 above), where additional heat and time are often required to form a uniform interference layer of the desired thickness (see trajectory 5).

With regard to the roughened surface embodiments herein, the roughening allows for uniform oxidation to occur quicker (shorter time) and at lower temperatures than corresponding smooth surface parts (see trajectory 6). The quicker and lower temperature anodization enables effective oxidation at temperatures further away from the BMG alloy's Tx. Keeping the processing temperatures further away from a BMG alloy's Tx is advantageous because it inherently reduces the risk of re-crystallization, due to atomic diffusion within the alloy being reduced as the temperature decreases.

As such, in the absence of a roughened surface, heat does not build up on the surface of the part very quickly, meaning that the surface area to volume ratio of the part is much lower, which means that the heat flux into the part is also lower. Therefore, getting a part's surface to reach a desired anodization temperature takes more time, as the entire part has to reach the set-point temperature (heat is transferred to the center of the part from the surface). This slow heating process for a part, as shown in FIG. 3A, runs the risk of crystal formation within the BMG part (see trajectory 5). Crystal formation in a BMG part significantly reduces the part's mechanical strength, among other things, including corrosion resistance, and reduces the overall value of the part. This is particularly true for a part that includes a transition metal like zirconium, which acts as a good insulator and thereby a poor thermal conductor (further increasing the time required to heat the part).

Figure 5:
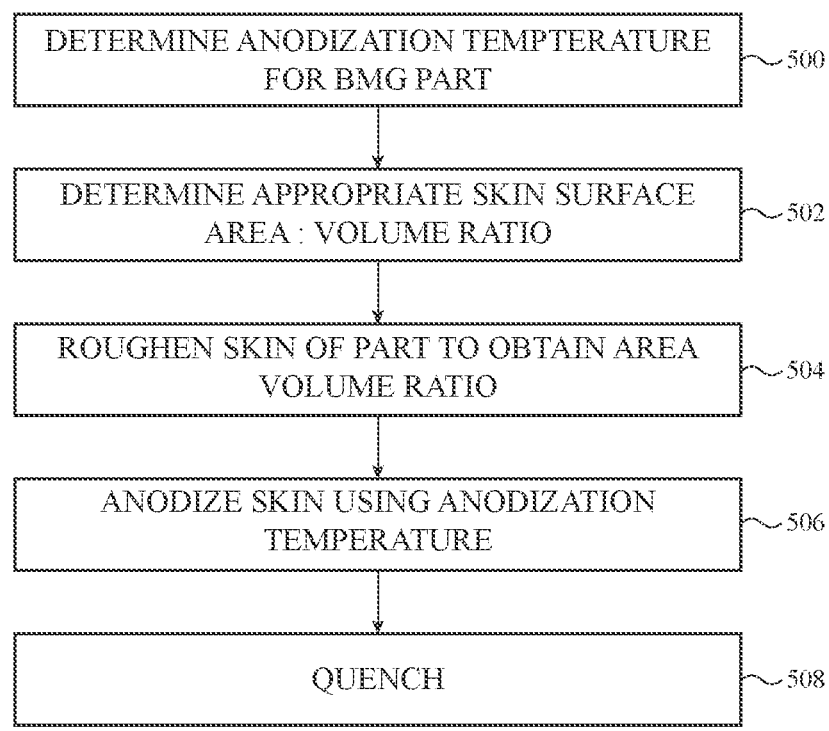
FIG. 5 is a flow diagram of one method for interference layer production in accordance with embodiments herein.

In embodiments herein, as shown in FIG. 5, an anodization temperature is identified for a BMG part based on the part's alloy composition, the atmospheric conditions of the anodization, the duration of the anodization, and on the thickness of the proposed interference layer 500. Once an anodization temperature has been determined, the required skin roughening ratio is also determined (typically expressed within a range of effective roughening ratios or an absolute surface roughness (Ra) value), i.e., the surface area to volume ratio 502 or surface roughness as an averaged measurement of peak-to-valley height along the surface of the part. Based on the ratio, the BMG skin is roughened appropriately 504. Once the skin is prepared, the skin is anodized at the pre-determined temperature for an appropriate amount of time 506, and then quenched 508. The part will have an uniformly thick oxide layer with a minimal amount of BMG part crystallization.

Note that an oxidation or set-point temperature for purposes herein refers to the temperature that determines the final thickness, and consequent color, of the part's surface for a given time duration and atmosphere. Interference layer thickness and chemical composition is a function of both temperature and time, and also the available oxygen, nitrogen, and other gaseous elements available to be absorbed into the layer.

Figure 6:
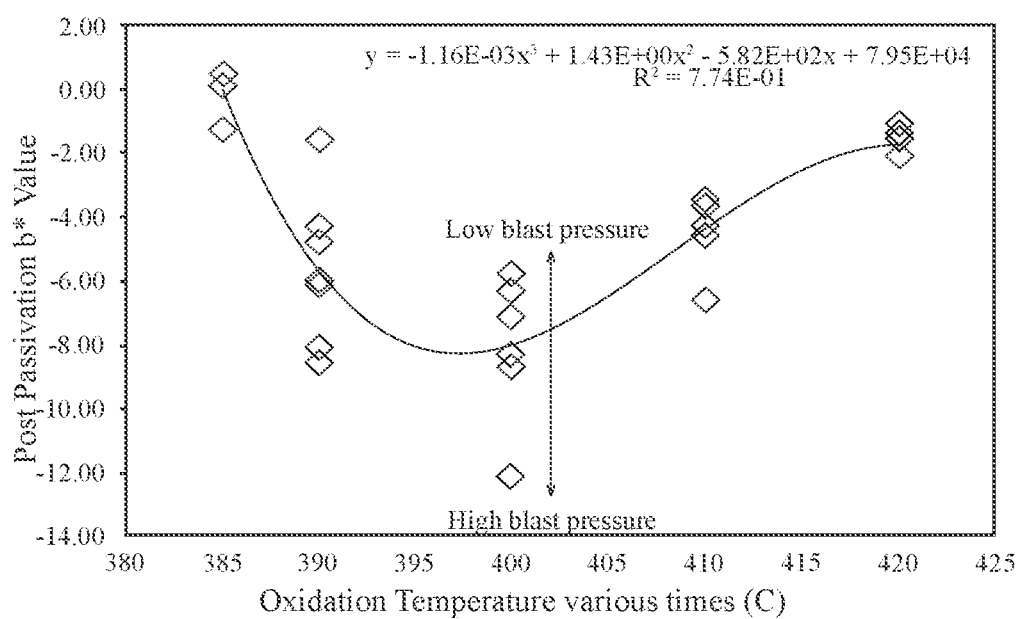
FIG. 6 shows a oxidation temperature versus post passivation b*value chart for an illustrative BMG.

FIG. 6 illustrates the influence of an oxidation or set-point temperature on the b*value (using the L*a*b*scale, a commonly employed color mapping scale) as measured in the final BMG part surface for a specific BMG alloy (other alloys will have different characteristic chromatic responses). As shown in FIG. 6, as the b*value decreases the BMG part becomes more blue up until 399° C., after which the part starts becoming less blue with continued increasing temperature. FIG. 6 shows a zirconium-based BMG part that was bead-blasted in accordance with embodiment herein. Note that in FIG. 6, the scatter along the vertical axis at each set-point temperature is due to the differences in blasting media and applied blasting pressures prior to oxidation. The trend in blue hue is the same for each set-point temperature, regardless of what particles were used to blast the part's surface. Finally, the transition from a more negative to a more positive b*value occurs right at the glass transition temperature (Tg) of the alloy, a point of reference which may prove valuable in predicting the characteristic chromatic changes in other BMG alloys.

In one embodiment, the roughened surface is prepared on the surface of the BMG part after molding. The surface of the molded BMG part is prepared by media blasting using ceramic, sand, glass, metal, or other materials to uniformly disrupt the surface of the BMG part, creating a random distribution of microscopic peaks and valleys on the part surface. Traditional media/bead/sand blasters can be used for this process, with pressures ranging from about 0.1 to 1 MPa. Blasting can be performed by hand, robot, rotary system or any other method so long as the blasting is uniformly distributed over the cosmetic or functional part of the component, since the surface uniformity affects the final color of the part after oxidizing. Tumbling or vibratory polishing (common industrial practices) of the part in various media to achieve different looks (ceramic, glass, wood, plastic, walnut shell, etc.) can also produce similar surface disruption, but on a less aggressive scale (peak-to-valley measurement is lower). Wire brush, sandpaper, or other abrasive cloths can also be used to give the part a brushed look (also common industrial practices) prior to oxidation. The part can also be partially masked during the surface disruption process to create a pattern, text, or logo, or other surface feature on the part that would be preferentially highlighted after the oxidation procedure.

In another embodiment, the surface or fraction of the surface is pre-oxidized/ablated with a laser to create a pattern, text, or other surface feature on the part. It has been noted that the pre-oxidized/ablated regions of the BMG part remain a lighter color than the rest of the anodized part once the anodization process is complete. In this way, text or other graphics can be incorporated into the surface design of the part which are a different hue to that of the rest of the anodized BMG part. This could be considered a form of masking.

In another embodiment, the surface of the molded BMG part is roughened by laser or chemical etching. Lasers are used to melt or ablate metals for many different purposes, including cutting, marking, functionalizing (making hydrophobic, less reflective, etc.) or drilling. Lasers with sufficiently high repetition rates can even be used to colorize the surfaces of metal objects by creating patterns on the order of visible light wavelengths. Creating regular or random patterns by laser ablation of BMG surfaces can be used as a roughening treatment to aid in construction of a uniform oxide layer on the BMG part.

Chemical etching can achieve random disruption of the part surface, and is useful for a roughening treatment of the BMG part. Chemicals typically used for etching include ferric chloride, hydrochloric, nitric, and hydrofluoric acids.

In each of the post molding procedures, the surface treatment is meant to prepare a uniform series of peaks and valleys in the surface to impart a higher surface area to volume ratio. As discussed above, identifying the necessary surface area to volume ratio for a given temperature facilitates consistent and uniform metal oxide layer thickness and composition. However, embodiments include only having an approximate or limited knowledge of the exact surface area to volume ratio on a part, but rather, knowing only that the roughening process will provide be consistent and effective at allowing for controlled anodization. In this manner, the final chromatic and textured look of the part will be less important as long as the chromatic and textured look is consistent and uniform.

In an alternative embodiment, the roughened surface is prepared during the BMG molding process. In this embodiment, the BMG parts are molded with a blast finish in the injection molding or die casting process, thereby removing the necessity of a separate media blasting step. The injection or die casting mold is prepared to include a negative imprint of the finished surface preparation, for example, uniform peaks and valleys having an appropriate surface to volume ratio.

In a further embodiment, a roughened surface is prepared for a BMG part having a combination of different preparation zones which yield a surface having two or more, three or more, four or more, and the like, different zones of roughness and different oxide layer thicknesses and thereby colors (and to some extent, texture). This embodiment can include a surface where only the zone being treated is available for media blasting, and then a zone being made available for a laser etched pattern, and the like. Any combination of surface roughening patterns or zones can be included on the BMG part surface, including a first zone imparted on the surface via a mold pattern.

Finally, BMG parts can be treated with a blend of surface preparations to provide a unique aesthetic look to the BMG surface, for example, treating a BMG part with both media blasting and tumbling, or laser and chemical etching, and the like. In some embodiments, the surface preparation is targeted at providing a useful surface to volume ratio for anodization so as to avoid crystallization. In these cases a part may be treated less to obtain an uniform coloring and more to avoid crystallization during anodization.

Anodization of surface roughed BMG parts can be accomplished in any variety of manners, including electrochemical, heat, and the like. Control of the anodization process across the entirety of a roughened surface is unexpectedly beneficial as it provides consistent compositions and thicknesses of protective oxides. Small variation in the heating of the BMG surface can have significant effects on the composition and/or thickness of a protective oxide layer, resulting in significant color variation and effectiveness of the oxide layer on the BMG part.

Upon completion of the anodization process the part is quenched to avoid crystal formation, a process that is significantly more effective when the surface has been treated in accordance to embodiments described herein. Also of note, embodiments that include roughening the surface of a part include the surface texture as part of the part's aesthetic look.

Embodiments that include the Heat Anodization mold embodiments, may result in BMG parts having a smooth surface or a roughened surface as described below.

Heat Anodization Mold

In alternative embodiments, heat anodization molds are provided for uniformly and relatively quickly heating a surface of a BMG part. As above, the rapid and uniform heating of a BMG part allows for uniform interference layer formation, thickness, and therefore coloring.

In embodiments where either i) the surface roughening process adds sufficient uniformity to an anodized interference layer or ii) the exact color of the part may not be especially important, or iii) the uniformity of the interference layer appearance is less important than an increase in wear, scratch resistance, or other durability, a traditional oxidation furnace may be used to achieve successful heat anodization of the BMG part. Specifically, a conveyor furnace with tightly controllable heat zones and variable belt speeds capable of controlling cover gases designed to operate near the glass transition temperature of the alloy may be able to produce commercially acceptable parts.

In certain embodiments of the heat anodization mold, a loose fitting mold is constructed from a high thermal conductivity and heat capacity material that generates a high heat transfer coefficient between the mold itself and the surface of the part. Molds composed of copper, nickel coated copper, and aluminum are typical. Each material has different advantages. Copper molds have a very high heat capacity and therefore provide greater uniformity of heat to the part, but they also take longer to heat from room temperature, or ramp up and down quickly, and so must be provided with a powerful enough heat source so that the temperature in the part being oxidized does not fluctuate from the set-point temperature. Copper, however, oxidizes readily at elevated temperatures, and the copper oxide easily flakes off the mold, creating regions of high and low thermal conductivity between the mold and the part after several uses (where the copper oxide is thick, the oxide acts as an insulator between the mold and the BMG, and where the copper oxide is removed, there is no insulation, and very good thermal contact between the mold and BMG). Nickel coated copper minimizes the build-up of copper oxide on the surface of the oxidation cavity, but after several cycles from room temperature to ~400° C. the nickel coating can become delaminated.

Higher quality coatings of chrome, aluminum, their alloys, or nitrides also lend themselves to this application. Aluminum has a lower heat capacity than copper, but high enough thermal conductivity so that it transmits heat rapidly between the heat source and the BMG. As long as the heat sources respond quickly to changes in the part temperature, aluminum is an adequate mold material. One disadvantage of aluminum is it's thermal expansion coefficient is large, so that the oxidation mold must be designed with the operating temperature taken into consideration, so that the cavity dimensions are appropriate when the mold is heated to the set-point temperature. Aluminum has the added advantages of being lightweight, cheap, easy to machine, and quick to bring up to temperature due to the low heat capacity of the material, though it does tend to creep at elevated temperatures. A high-temperature aluminum silicon alloy with high heat capacity is also within the scope of the present disclosure. Other effective mold materials would include copper beryllium (for good heat capacity, resistance to oxidation, and rigidity), steel alloys (for machinability and rigidity), and ceramics (for resistance to oxidation, low thermal expansion coefficients).

Regardless of mold material, it has been found that roughening the surface of the mold cavity, shut-off and other mating mold surfaces improves the uniformity of the anodized coating. Although difficult to prove experimentally, it is believed that this practice provides a more consistent flow of atmospheric gases to the part throughout the anodization process, so that no surface locations are 'pinched' by the mold and therefore sealed off from the flow of oxygen, nitrogen, etc. An alternative embodiment which stems from this knowledge would incorporate a pressurized source of oxygen, air, or other gas into the loose fitting cavity of the oxidation mold to ensure that all surfaces have access to the same concentrations of gases. For example, a small channel cut in the mold could connect a gas cylinder to the loose fitting cavity.

Figure 7A:
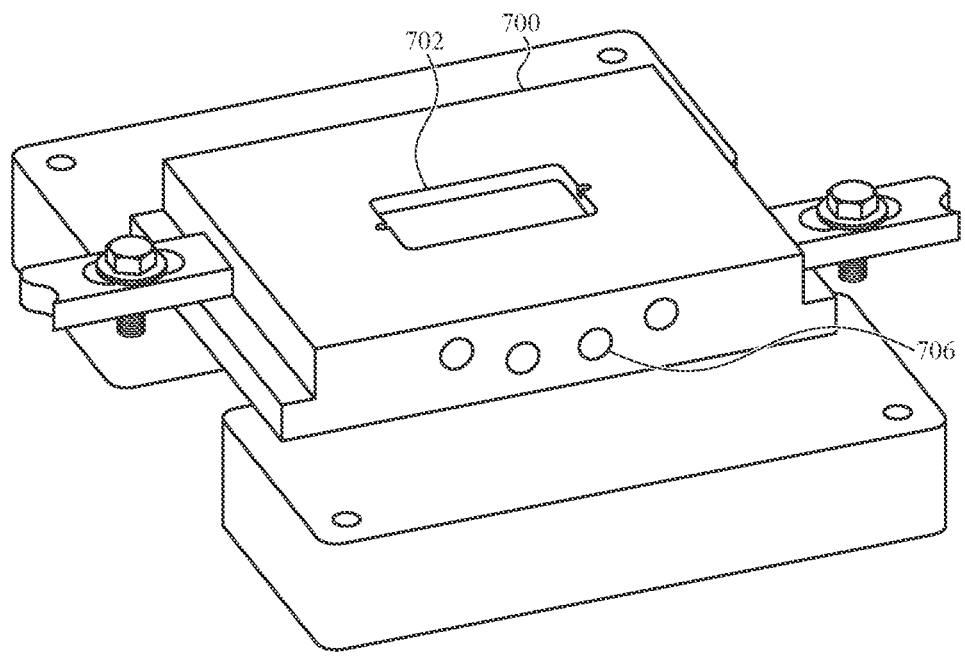
FIGS. 7A and 7B show a heat anodization mold in accordance with an embodiment herein.
Figure 7B:
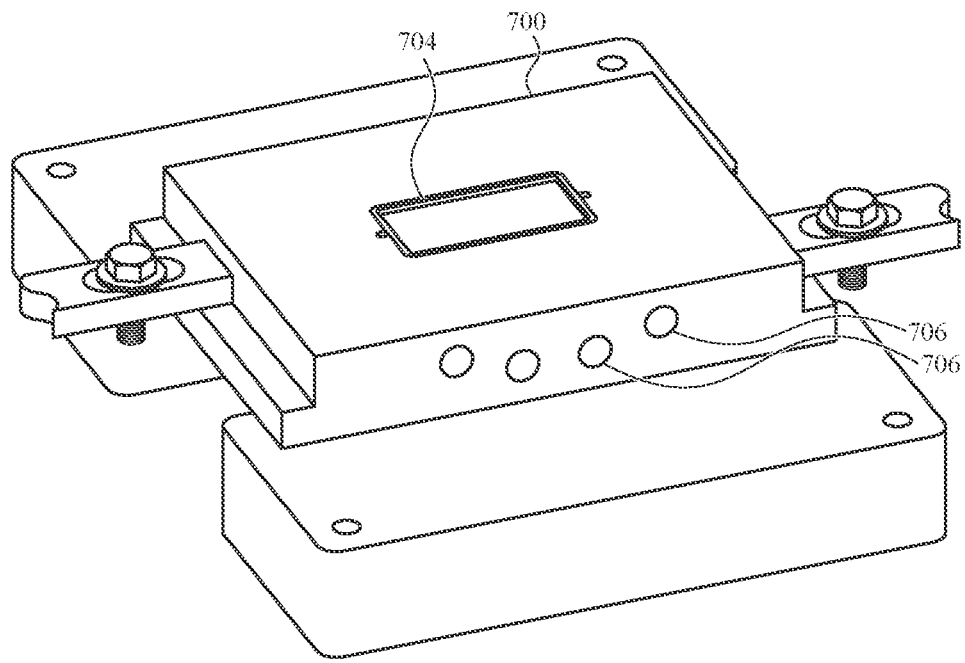

In one embodiment, and as shown in FIG. 7A, the heat anodization mold 700 has a cavity 702 that generally follows the geometry of the part being oxidized. The mold in this embodiment acts as an oven, which comes in near-direct contact with the surface of the BMG part 704 when the mold is closed (see FIGS. 7B and 10B). Once the BMG part is secured in the mold, the mold is rapidly and uniformly heated via heating cartridges 706 (see FIG. 7C for holes where cartridges would be placed). In typical embodiments, a uniform gap is provided between the mold and the corresponding BMG part (not shown). Typically sized gaps (width) are sufficient to allow for oxidation to occur at the surface of the heated part.

In one embodiment, the gap is 0.001" to 0.025" in width and more typically between 0.001" and 0.005" in width. The heated mold then remains at the fixed-point temperature for anodization. Note that the fixed-point temperature is typically predetermined based on an alloy's composition, anodization timing, and the part's target oxide thickness. Because the anodization temperature is elevated, timing of the anodization and subsequent quenching must be minimized to avoid BMG crystallization. Note that the high heat transfer coefficient to the surface of the part should be high enough to overcome the heat transfer from the surface of the part to the body of the part (which heats more slowly), eventually equilibrating with the heat anodization mold set-point temperature. As such, by rapidly heating and maintaining the temperature of the part surface, even highly polished as-molded surfaces can be given uniform thickness oxidation or interference layers, which consequently appear uniform in color due to the interference layer color effect.

In some embodiments, the gap between the mold and BMG part is atmospherically controlled to have a known amount of oxygen, nitrogen, argon, or other atmospheric constituent, including the imposition of a vacuum. Gap compositions can be set such that the growth and composition of the anodized interference layer can be controlled. In some embodiments, the gap atmospheric composition is put together to maximize $ZrO_2$ as the principle aspect of the oxide layer. In other embodiments, the gap atmospheric composition is optimized for nitride formation, for example $Zr_3N_4$ a well characterized nitride with a silvery-gold color (particularly where a chromatic appearance is of interest). In this manner, both the consistency/thickness and the oxide layer composition can be closely controlled to both obtain a consistent color and color of interest.

Heating of the heat anodization molds can be controlled by resistive heating, for example heater cartridges, inductive heating, for example high conductivity coils and alternating current, or via a fluid like hot oil. In some aspects, the heating of the heat anodization mold is programmable, allowing for the anodization temperature to be dynamic throughout the anodization process. In this case, the heat anodization mold should be constructed of a material with low enough heat capacity in proportion to the amount of heat per unit time that the heating system can deliver to the mold, such that the mold temperature can be ramped up and down rapidly, typically starting from an ambient or room temperature. For instance, if the mold is made of copper (mass heat capacity of 3.45 $J/cm^3$–K) and has a volume of 70 $cm^3$, the power required to heat the mold 1 degree Kelvin per second will be 241.5 Watts (J/s). In an additional embodiment, the mold walls could also include cooling lines for water or other like liquid to be used to cool the mold back to ambient temperature, once the anodization process has been completed. This is particularly helpful where multiple parts need to be anodized in the mold and a consistent starting temperature is required (typically room temperature). To avoid confusion, room or ambient temperature herein means any temperature between about 17° C. and about 24° C.

In another embodiment herein, the heat anodization mold is a molten salt bath with a temperature set at the intended anodization temperature for the target BMG part. The molten salt bath includes an outer encasing mold that encases the target BMG part in a sufficient quantity of molten salt or other ionic liquid. Typical molten salts include typical thermal salts like molten chloride salt mixtures, fluoride salt mixtures, and nitrate salt mixtures. One type of molten salt is composed on 60% sodium nitrate and 40% potassium nitrate (a liquid between 260-550° C.). The molten salt inside the mold is heated to the predetermined anodization temperature for the BMG part and oxide layer. As above, once the anodization step is concluded the BMG part is removed from the molten salt bath and the part rapidly quenched.

In yet another embodiment, the heat anodization mold is a mold or vessel filled with particles of a high thermal conductivity material. The particles allow air or gas to circulate between them, but are dense enough so that when the BMG article is plunged into them, they conform around the article and rapidly transfer heat to the article's surface.

Figure 8:
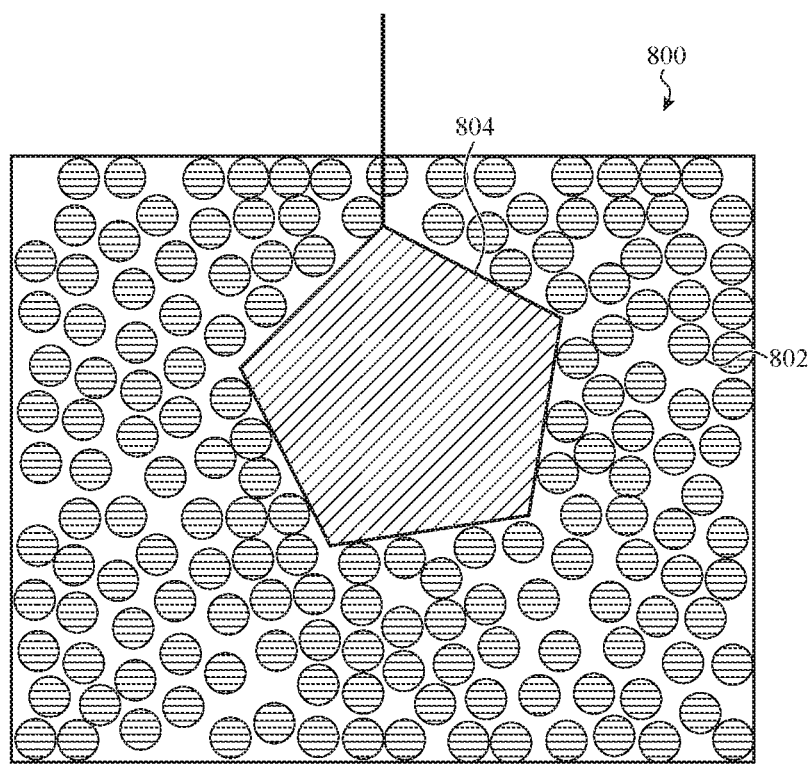
FIG. 8 shows one illustrative BMG anodization mold in accordance with embodiments herein.

As shown in FIG. 8, a vessel 800 houses a quantity of particulates 802 that can be heated to the anodization temperature, which then transfer the heat to the BMG part 804 in a rapid and effective manner. Typical thermally conductive particulates 802 for use herein are smooth pellets with average widths in the 0.1-40 mm range, and more typically in the 0.5-20 mm range. The size of the particles is chosen appropriately based on the typical features of the part being anodized so that the particles can 'flow' into the smallest features, thereby producing as much physical contact between the heat delivering particles and the BMG part. Typical particulates are composed of aluminum, silver, copper, or graphite. Particulates can be spherical, circular, oblong or other like shape (as well as mixtures thereof). As above, the anodized part 804 is quenched to avoid BMG crystallization. In an alternative aspect, the particulates can be gently agitated during the heat anodization process in order to improve uniformity and quantity of the heat transfer between the particles and the BMG part.

Finally, embodiments herein include uniformly adding texture to the inside surface of the various heat anodization molds described herein. In this embodiment, texture is added to the inner surface of the mold to improve the uniformity of heat transfer between the heat anodization mold and the BMG part.

In these embodiments, the entire roughened or modified mold surface will have the same or similar heat transfer coefficient to the BMG part. This is in contrast to trying to make the mold come perfectly in smooth contact everywhere with the BMG part, which can leave regions of the part in direct contact with the mold, and other parts having small gaps of air between the mold and BMG part. Having a textured (roughened) mold also facilitates air (oxygen, nitrogen, etc.) atoms to travel more freely between the mold and BMG part. In this way, the entire surface of the BMG part is in contact with an adequate oxygen supply, such that oxygen diffusion into the part is the same everywhere. This also enhances uniform growth of the oxide layer during anodization. A rough or modified surface can be added to the oxidation mold by traditional sand, or like particle, blasting techniques, for example.

As discussed above, anodization is performed using the above described molds. The actual anodization process is known and timed to provide an interference layer of a targeted thickness. In some aspects, the thickness of the interference layer is important for durability reasons as opposed to aesthetic reasons. Durability could increase wear resistance, resistance to scratching or abrasion, resistance to chemical attack, corrosion, or other damage. Having a uniformly thick layer of a desired thickness can provide predictable durability of the final BMG part, for example, a frame for a portable electronic device. However, even where durability is at issue, it is important to anodize a consistent thickness for the interference layer, where the thickness is less dependent on a resultant color and more dependent on the protective nature of the layer.

The following Examples are provided for illustrative purpose only and are not intended to limit the scope of the invention.

EXAMPLES

Example 1

Interference Layer Thickness and a Surface's Chromatic Appearance

Figure 9:
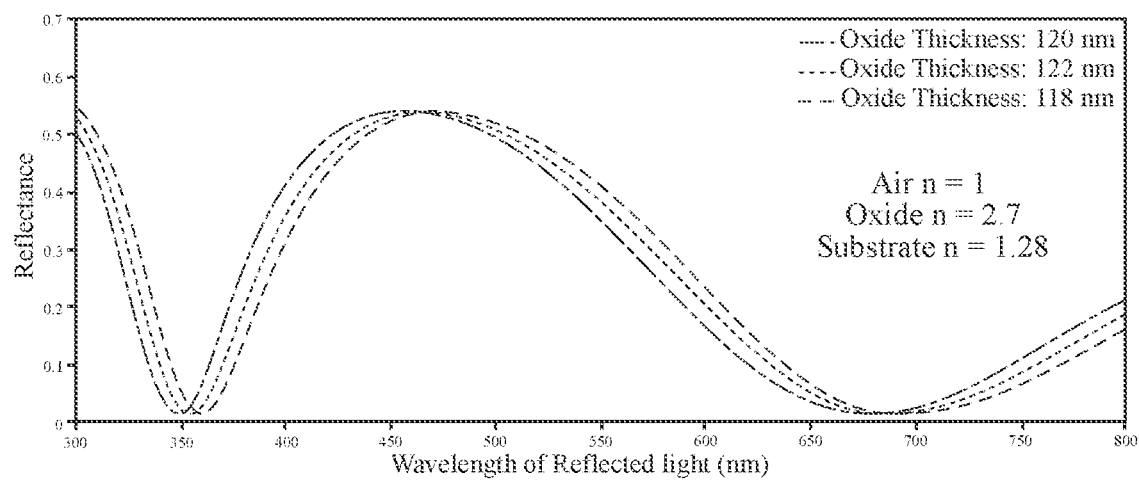
FIG. 9 is an illustrative plot of wavelength of reflected light versus reflectance in accordance with an embodiment herein.

It is known that the human eye can distinguish small changes in the wavelength of light in the 400-700 nm region (blue to red). This indicates that fairly small shifts in a reflected spectrum (and therefore very small changes in the interference layer thickness) can be discerned by the human eye. The reflected light is a spectrum of colors however, and not a single wavelength, so the perceptible shift is muted by the sum of the frequencies under the curve. FIG. 9 shows the impact of a +/−2 nm change in an oxide layer thickness to be a 17 nm in peak wavelength, even though the majority of the reflected spectrum remains unchanged. More significant changes in oxide layer thickness, for example, 10 nm, would then certainly result in a discernable change in the reflected light spectrum.

This Example illustrates the importance of carefully controlling, and minimizing variation in, a BMG part's oxide layer thickness. Small variations in interference layer thickness can have an impact on a part's chromatic look, with larger variations, particularly at the blue end of the spectrum, having a significant outcome. It is also worth noting that an oxide layer's thickness can be used to impart different colors at different surface regions of a part. Using embodiments herein, imparting a preplanned oxide layer thickness on a region of a part's surface can be used to provide part's with multiple pre-planned chromatic looks.

Example 2

Identification of Oxidation or Set-Point Temperature Based on An Alloys Tg

Using Tg as a reference for a known BMG and interference layer allows for the prediction of a useful oxidation temperature, particularly where the predictive BMG part has a similar given chemistry (constituent elements drive the composition of the oxide layer when it forms). This is particularly true as the diffusivity of oxygen in the amorphous BMG and diffusivity (atomic mobility) of the constituent elements are key.

If the chosen oxidation temperature for a known alloy is found to be 410° C., then Table 1 can be created for several other known zirconium based BMG recipes, based on the percentage increase in anodization temperature (Ta) over glass transition temperature (Tg). Note that Ta=x* (Tx−Tg) +Tg, where x is based on the known alloy oxidation temperature according to (Ta−Tx)/Tx. This formula is a very rough guide for keeping far enough away from each alloy's crystallization temperature (Tx), and still finding an appropriate oxidation temperature.

TABLE 1

Illustrative anodization temperatures (Ta) from the glass transition (Tg) and crystallization temperatures (Tx) of bulk metallic glass alloys, and based on the empirically discovered reference anodization temperature of LM105.

| Alloys | LM105 | LM601 | LM106a | LM-001B |
|---|---|---|---|---|
| Tg | 399 | 416 | 394 | 350 |
| Tx | 468 | 496 | 503 | 483 |
| Ta | 410 | 428.8 | 411.4 | 371.3 |

Note that LM-105 is composed of $Zr_{52.5}Ti_5Cu_{17.9}Ni_{14.6}Be_{10}$; LM-601 is composed of $Zr_{50.7}Cu_{36.2}Ni_{4.03}Al_9$; LM-106 is composed of $Zr_{58.47}Cu_{15.64}Ni_{12.76}Nb_{2.7}Al_{10.37}$; and LM001B is composed of $Zr_{44}Ti_{11}Cu_{10}Ni_{10}Be_{25}$.

Example 3

Illustrative L*, a* and b*Values

Modification of blasting pressure, blasting time, oxidation temperature and oxidation time can be used to provide a uniform color and texture for a target BMG part. Importantly, by keeping each of the parameters uniform, a series of similarly composed parts may be produced having the same surface texture and look. Systematic changes to any one of the above parameters may result in a part having a different texture or chromatic look.

Table 2 provides four illustrative colors produced by various combinations of parameters during the blasting and oxidizing processes:

| Parameter | Part 1 | Part 2 | Part 3 | Part 4 |
|---|---|---|---|---|
| L* | 39.34 | 41.84 | 39.37 | 38.69 |
| a* | −0.60 | −1.52 | −1.43 | −2.24 |
| b* | −3.28 | −7.29 | −8.92 | −12.97 |

Example 4

Ra Value and BMG Surface Oxidation

In aspects of the present disclosure, BMG parts that have roughened surfaces, in accordance to embodiments herein, may be heated in an appropriate heat anodization mold. So for example, a BMG part having an increased surface area to volume ratio (over a smooth surface) is placed in the mold shown in FIG. 8.

Since the actual surface to volume ratio of a part is dependent on the part geometry, specifying the surface roughness value (Ra) can be used to quantify the amount the surface has been disrupted by the tumbling or blasting, for example. Current molding practices can achieve surface roughness values of approximately 0.05 um Ra, which is equivalent to what typical lapping or polishing processes can achieve. Blasting media and pressures tested in this application have increased the surface Ra value to as much as approximately 3 um Ra. As described in ASME B46.1, Ra is the arithmetic average of the absolute values of the profile height deviations from the mean line, recorded within the evaluation length. Even very small disruptions to the surface can have a positive impact on oxidation uniformity. Vibratory polishing or tumbling process can produce surface roughness values of anything between the as-molded Ra value of 0.05 um and 0.25 um. These surface roughness values were found to create vibrant lighter colors because they facilitated the oxide growth, but did not decrease the luminosity values of the BMG surface.

As above, the surface modified BMG part is precisely heated and quenched to avoid crystallization, but optimize surface oxide uniformity at the desired thickness, and thereby color.

With respect to the surface preparation embodiments, and the heat anodization embodiments, the present disclosure provides significant advantages toward making uniform oxide or interference layer coatings on BMG parts. The embodiments herein can include methods of preparing a uniform interference layer across the entirety of a part's surface, within a zone.

Example 5

Illustrative Oxidation Mold Set-Ups

Figure 10A:
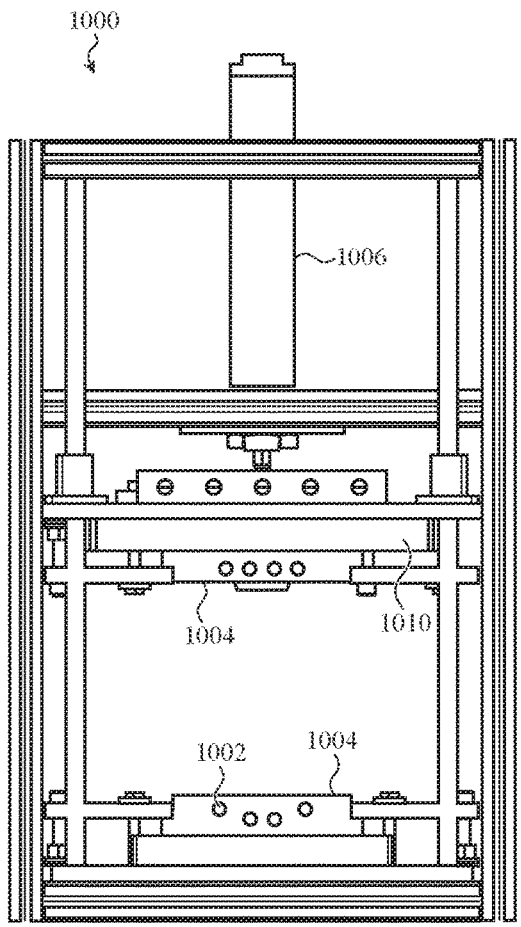
FIGS. 10A and 10B show an anodization molding apparatus before (FIG. 10A) and after closure (FIG. 10B), in accordance with embodiments herein.
Figure 10B:
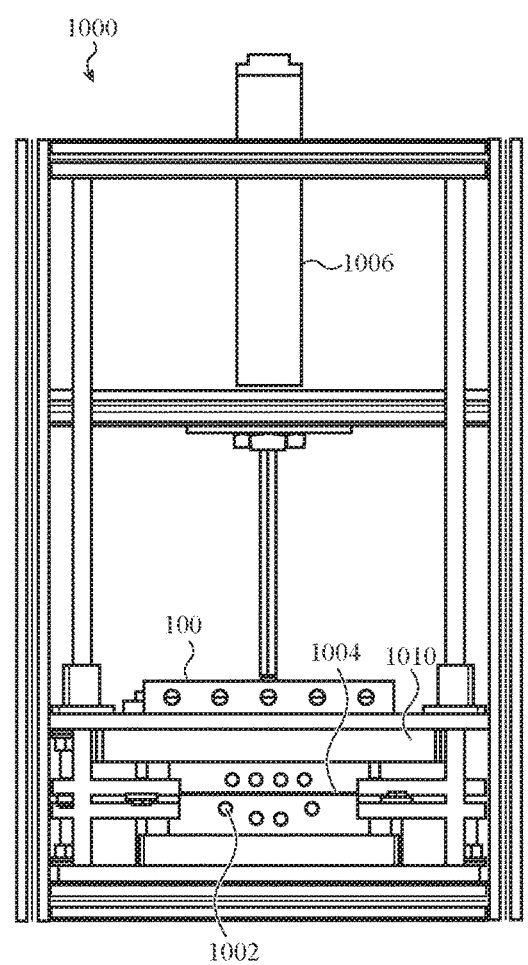

More details on the oxidation mold set-up is shown in FIG. 10. A customized press 1000 was designed to allow for rapid insertion and extraction of the BMG piece into a two piece oxidation mold which opened and closed vertically. The oxidation mold 1004 was powered by eight cartridge heaters (240 Watt, 250 Volt each) 1002 wired in sets of two, such that the oxidation mold 1004 had 4 independently controlled heat zones with feedback thermocouples positioned close to the surface of the cavity (2-3 cm). The thermocouples were positioned midway between the cartridge heaters and the cavity surface so that they accurately represented the temperature of the mold at the location of the BMG part. Each heat zone was controlled by an I/O controller and relay, and was capable of maintaining a +/−° C. range. Tighter temperature control mechanisms would be even more effective in providing uniform heat coverage of the part and therefore even more uniformity and thickness control of the oxide layer, but these parameters were effective as a demonstration of the technology. Also shown in FIG. 10, an air cylinder 1006 for compressing and closing the mold, water cooling jacket 1008 for protecting the apparatus from overheating (parts were actively quenched in water after being removed from the anodization mold), thermal insulation 1010 for isolating the heat energy in the mold and the anodized part and away from the rest of the apparatus, the anodization mold 1004, and the heat cartridge heater holes are also shown.

What is claimed is:

1. A part comprising:
   a body composed of an amorphous alloy; and
   a metal oxide layer formed on at least a portion of a surface of the body, the metal oxide layer having a uniform thickness in a range of 5 nm to 3 µm and configured to produce an optical interference effect and the portion of the surface of the body having an average roughness value (Ra) greater than 0.05 microns and less than or equal to 3 microns.

2. The part of claim 1, wherein the average roughness value (Ra) of the portion of the surface of the body is greater than 0.05 microns and less than or equal to 0.25 microns.

3. The part of claim 2, wherein the average roughness value (Ra) of the portion of the surface of the body is greater than or equal to 0.25 microns and less than or equal to 3 microns.

4. The part of claim 1, wherein the thickness of the metal oxide layer is uniform to within 10%.

5. The part of claim 4, wherein the metal oxide layer is formed over an entirety of the surface of the body.

6. The part of claim 1, wherein the thickness of the metal oxide layer is uniform to within 5%.

7. The part of claim 1, wherein the thickness of the metal oxide layer is uniform to within 1%.

8. The part of claim 1, wherein the amorphous alloy is a bulk metallic glass.

9. The part of claim 8, wherein the bulk metallic glass comprises at least 40 wt % zirconium.

10. A portable electronic device comprising a housing and a cover glass, an external surface of the housing being defined by a metal oxide layer grown on at least a portion of an external surface of a bulk metallic glass housing component, the metal oxide layer having a uniform thickness in a range of 5 nm to 3 µm and configured to produce an optical interference effect and the portion of the external surface of the bulk metallic glass housing component having an average roughness value (Ra) greater than 0.05 microns and less than or equal to 3 microns.

11. The portable electronic device of claim 10, wherein the bulk metallic glass housing component comprises a bulk metallic glass alloy having at least 40% by weight zirconium.

12. The portable electronic device of claim 10, wherein the average roughness value (Ra) of the portion of the external surface of the bulk metallic glass housing component is greater than or equal to 0.25 microns and less than or equal to 3 microns.

13. The portable electronic device of claim 10, wherein the portion of the external surface of the bulk metallic glass housing component is uniformly rough.

14. The portable electronic device of claim 10, wherein the thickness of the metal oxide layer is uniform to within 15%.

15. The portable electronic device of claim 10, wherein:
   the portion of the external surface of the bulk metallic glass housing component is a first portion of the external surface of the bulk metallic glass housing component;
   a text or a graphic feature is engraved into a second portion of the external surface of the bulk metallic glass housing component; and
   the text or the graphic feature has a different hue than the external surface of the housing.

16. A method of making the product of claim 1, the method comprising:
   creating a uniformly roughened surface on at least a portion of a bulk metallic glass based article, the uniformly roughened surface having an average roughness value (Ra) greater than 0.05 microns and less than or equal to 3 microns; and
   oxidizing the uniformly roughened surface of the bulk metallic glass based article at a desired set-point temperature to form a metal oxide layer having a uniform thickness in a range of 5 nm to 3 µm and configured to produce an optical interference effect.

17. The method of claim 16, wherein the uniformly roughened surface extends across an entirety of an external surface of the bulk metallic glass based article.

18. The method of claim 17, wherein the bulk metallic glass based article includes zirconium.

19. The method of claim 16, wherein the uniformly roughened surface is prepared by media blasting, tumbling, and/or etching.

20. The method of claim 16, wherein the uniformly roughened surface is created during injection molding.

* * * * *